C. GITZENDANNER.
BOOK AND PAMPHLET MAKING MACHINE.
APPLICATION FILED JUNE 8, 1910.

1,028,708.

Patented June 4, 1912.
6 SHEETS—SHEET 1.

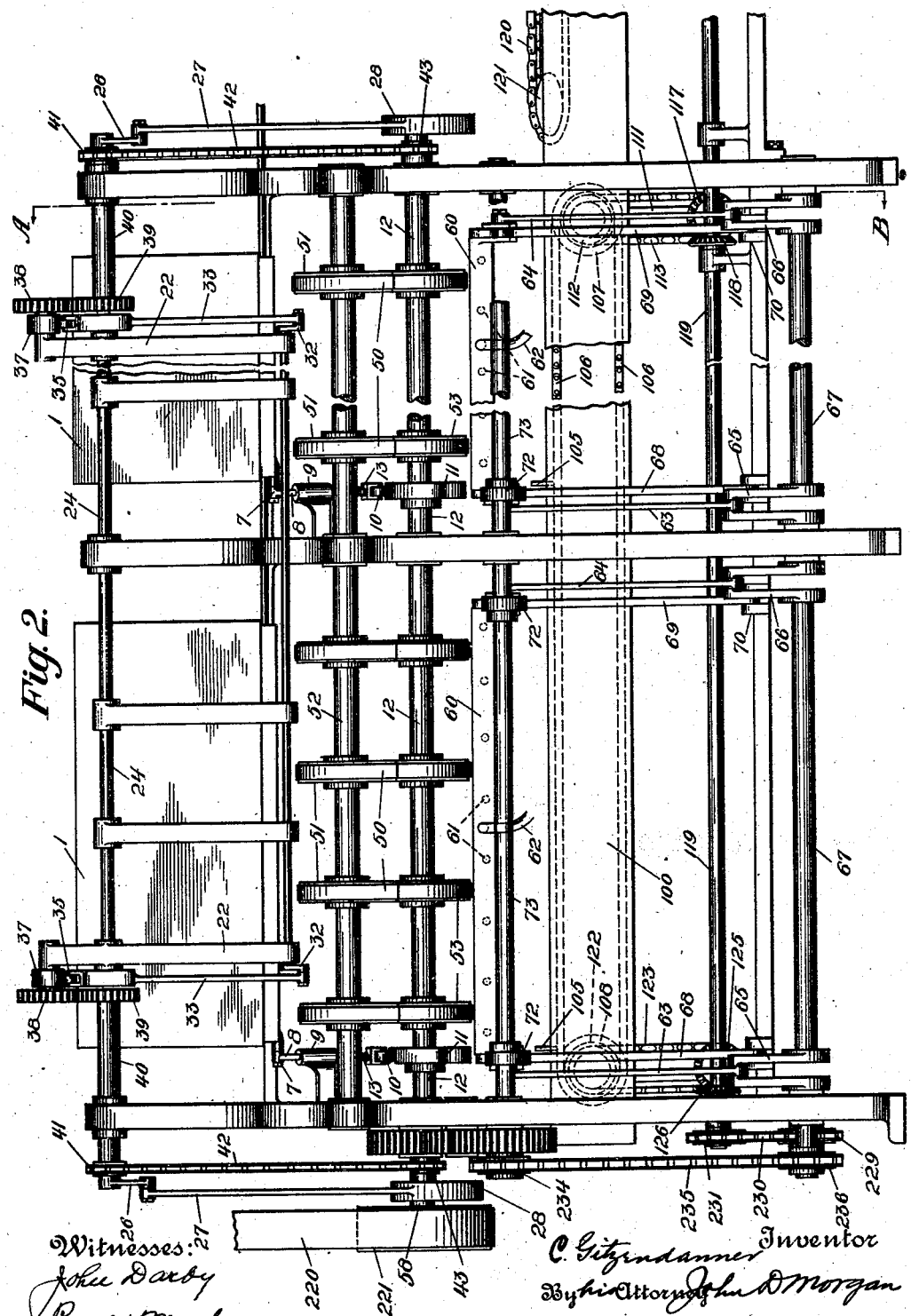

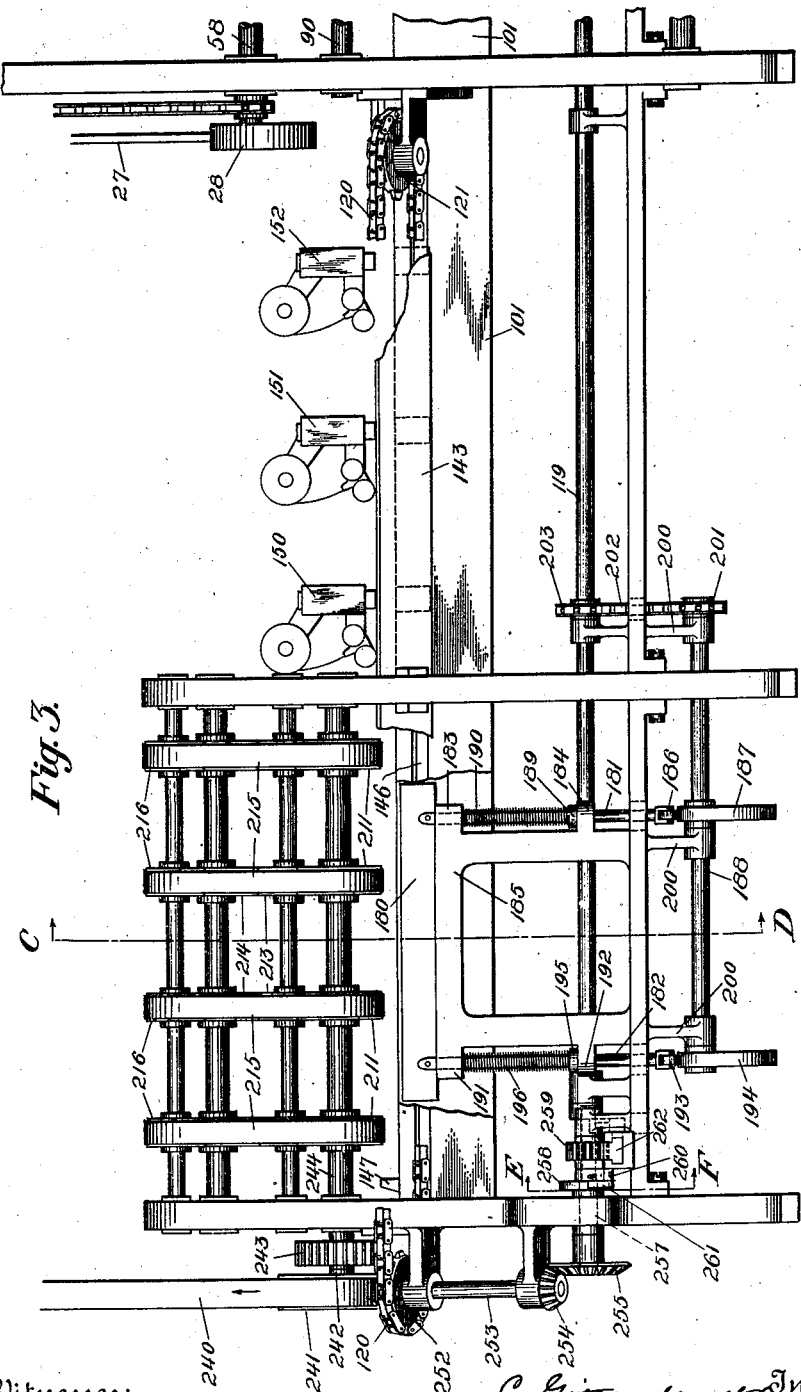

C. GITZENDANNER.
BOOK AND PAMPHLET MAKING MACHINE.
APPLICATION FILED JUNE 8, 1910.
1,028,708.
Patented June 4, 1912.
6 SHEETS—SHEET 4.
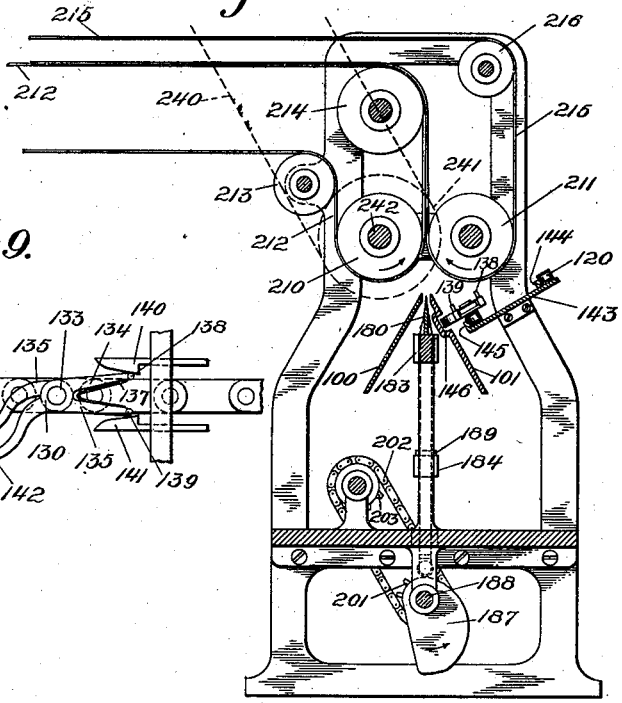
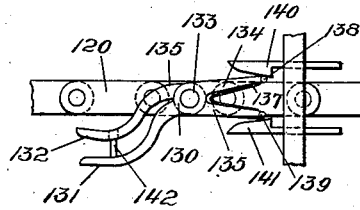
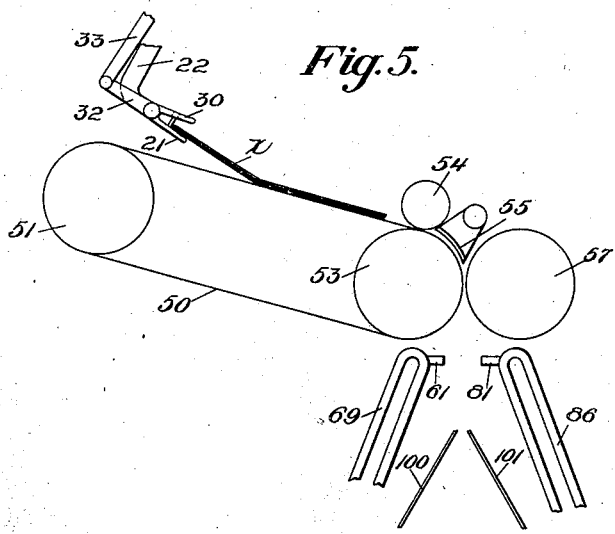
Witnesses:
C. Gitzendanner Inventor

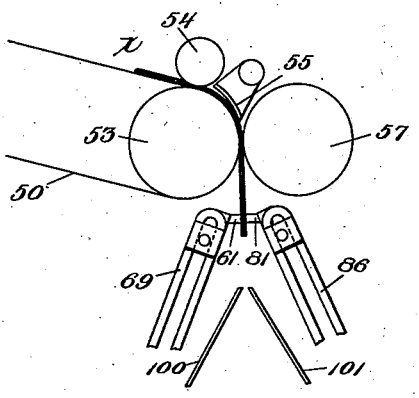
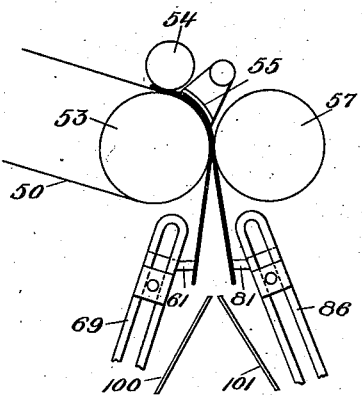
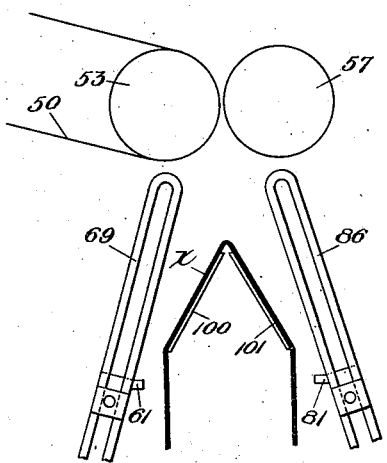

C. GITZENDANNER.
BOOK AND PAMPHLET MAKING MACHINE.
APPLICATION FILED JUNE 8, 1910.

1,028,708.

Patented June 4, 1912.

6 SHEETS—SHEET 6.

Witnesses:
John Darby
Rosa Menk

C. Gitzendanner Inventor
By his Attorney John D. Morgan

UNITED STATES PATENT OFFICE.

CHARLES GITZENDANNER, OF NEW YORK, N. Y., ASSIGNOR OF ONE-HALF TO WILLIAM H. HORTON, OF NEW YORK, N. Y.

BOOK AND PAMPHLET MAKING MACHINE.

1,028,708.

Specification of Letters Patent. Patented June 4, 1912.

Application filed June 8, 1910. Serial No. 565,818.

*To all whom it may concern:*

Be it known that I, CHARLES GITZENDANNER, a citizen of the United States, and a resident of New York city, in the county of New York and State of New York, have invented new and useful Improvements in Book and Pamphlet Making Machines, of which the following is a specification.

The invention relates to machines for making books or pamphlets and more particularly to machines for insetting or infolding a plurality of signatures one within another and stitching them together.

Objects of the invention are to provide a novel mechanism for insetting or infolding a plurality of signatures one within another and to stitch together while so inset or infolded to make a book or pamphlet; to provide a mechanism for so insetting or infolding signatures and for stitching them through between the outside of the outside signature to the inside of the inside signature; to provide for simultaneous insetting or infolding of a plurality of groups of signatures and the stitching of each group successively as it is completed; to provide for opening all the signatures previous to insetting or infolding and keeping them open until the stitching is completed; to provide for accurate registering of the sheets for stitching; to provide for automatic progression of the signatures through the machine to gather and inset the signatures to make the book, and also to stitch them together;
to provide for automatic delivery of the product from one mechanism to another and from the machine. These and other objects of invention will in part be obvious and will in part more fully appear herein.
The invention consists in the novel parts, constructions, arrangements, combinations and improvements herein shown and described.

Figure 1:
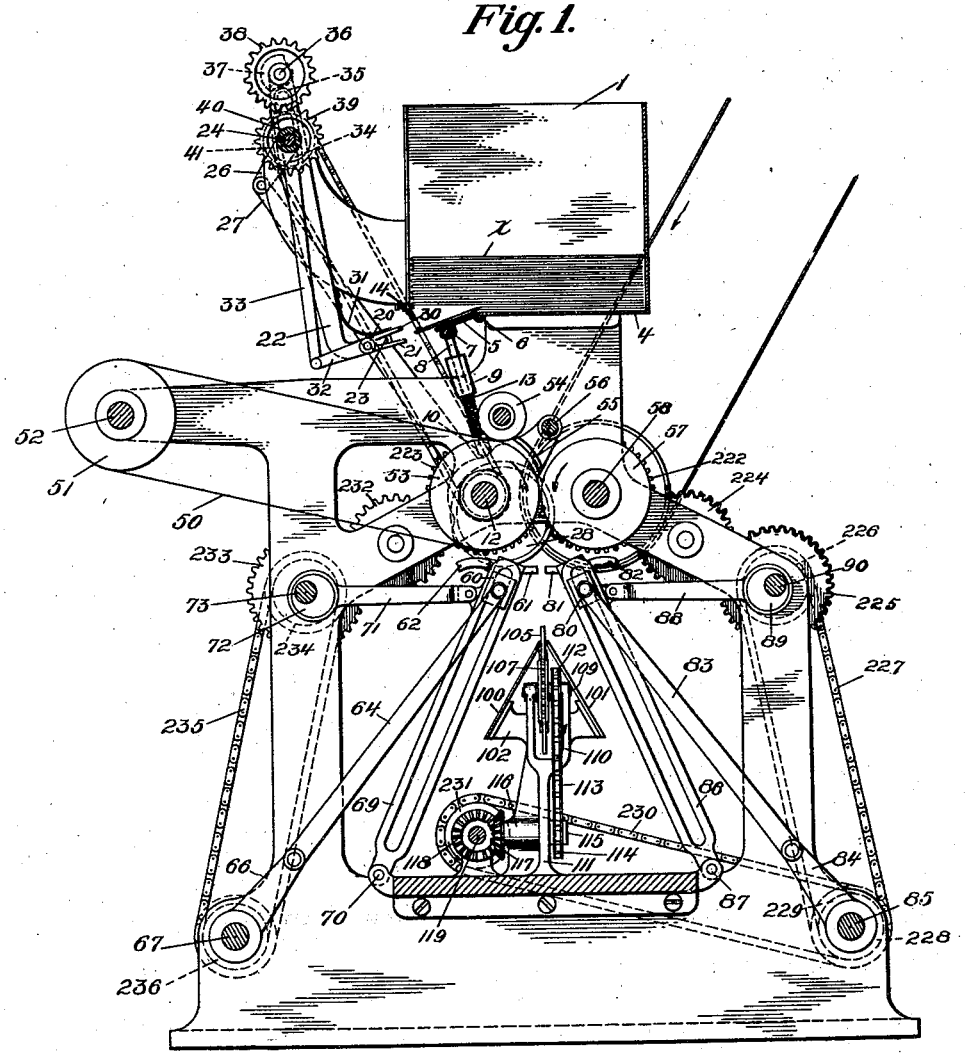
Figure 10:
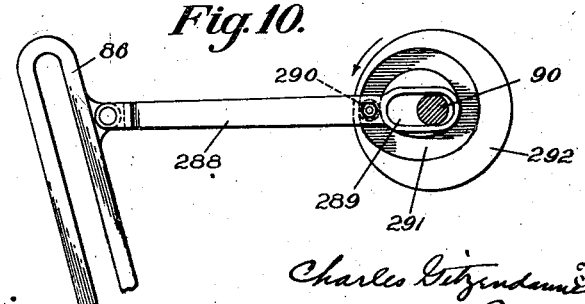
Figure 11:
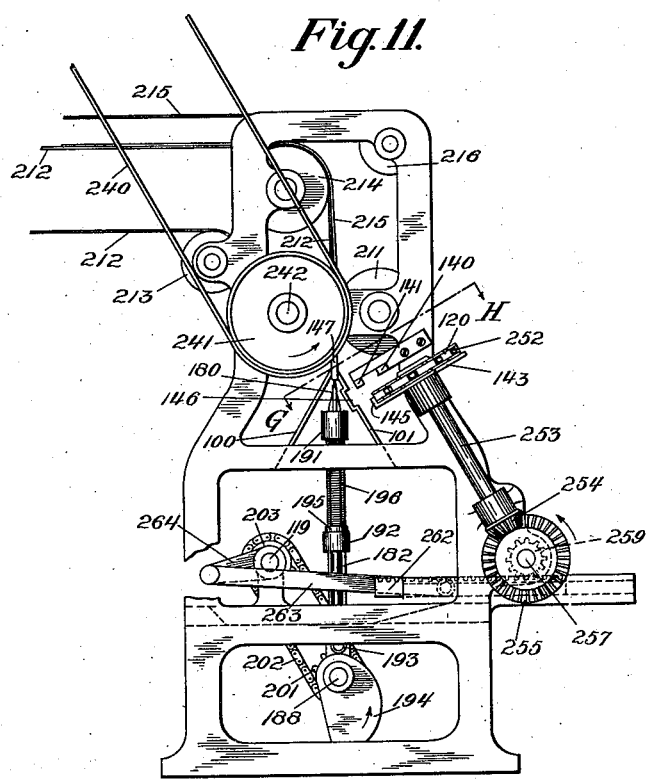
Figure 12:
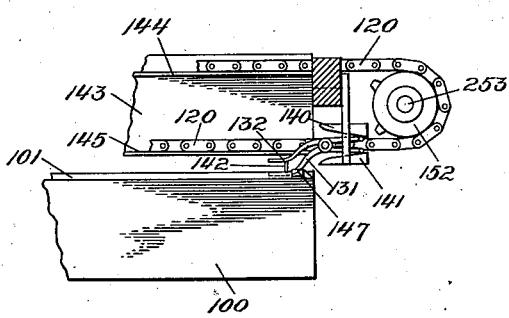
Figure 13:
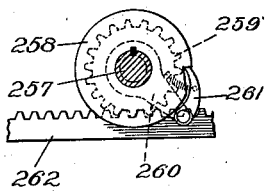

The accompanying drawings, referred to herein and forming a part hereof, illustrate one embodiment of the invention, the same serving in connection with the description herein to explain the principles of the invention.
Of the drawings:—Figure 1 is a sectional elevation on the line A—B of Fig. 2, looking in the direction of the arrows, but showing the container or magazine for the signatures in vertical section; Fig. 2 is a side elevation looking at Fig. 1 from the left, of part of a machine constructed in accordance with the principles of the invention; Fig. 3 is a view of a continuation of the machine at the right of Fig. 2 where it is shown broken away, but looking at the machine from the opposite side, that is from the right in Fig. 1; Fig. 4 is a transverse sectional elevation on the line C—D of Fig. 3, looking in the direction of the arrows; Fig. 5 is a fragmentary view, partly diagrammatic, showing the folded signature being fed to the opening devices; Fig. 6 is a similar view showing the opening devices engaging the signature just prior to the opening movement; Fig. 7 is a similar view showing the signature partly open and moving in such open condition toward the saddle; Fig. 8 is a similar view showing the signature laid over the saddle ready for progressing, the opening devices disengaged therefrom and returning to the position shown in Fig. 5 for the next operation; Fig. 9 is a detail of the gripper for conveying the sheet from the insetting or collating part of the machine to the stitcher; Fig. 10 is a fragmentary detail showing a different form of controlling device for the suction bar guides; Fig. 11 is an end elevation looking at Fig. 3 from the left; Fig. 12 is a fragmentary elevation of the intermittently-moving signature-conveying grippers; and Fig. 13 is a detail of the actuating mechanism for said chain.

The invention in one of its aspects provides for opening a plurality of signatures and insetting one within another and stitching them together; in accordance with one feature of the invention furthermore, means are provided for stitching the inset and opened signatures through and through, that is, stitching between the back of the outside signature through the fold of all the signatures and the inside or middle of the innermost signature.

In the embodied form of the invention, a signature is withdrawn from its magazine, opened and progressed into operative relation with a signature withdrawn from another magazine, and also opened, and one signature is inset within the other, this being repeated until the desired number of signatures are collated and inset, whereupon they are stitched together through and through to make a book or pamphlet.

In Fig. 2 of the drawings the machine is shown broken through or interrupted, but it will be understood that a series of the signature supplying and insetting mechanisms will be used sufficient in number for the size of book desired. Furthermore, signatures of different numbers of pages may be used to vary the size of the made-up book.

Suitable means for supplying signatures are provided and the general form thereof shown in the present embodiment is similar to that shown and described in my copending application Serial No. 567430 filed by me in the United States Patent Office on April 25, 1910.

A stack $x$ of signatures is shown within a holder or magazine 1 in Fig. 1. Said signatures are withdrawn one by one by being gripped or engaged at their back or folded edge, withdrawn from the stack and then fed to the opening devices. A portion 5 of the bottom 4 of the signature holder 1 is hinged at 6, and is pivotally connected at 7 to a rod 8. The rod 8 is shown working in an aperture in a lug 9 carried upon the frame of the machine. Said pivoted rod 8 carries at its free end a cam roller 10 coöperating with a cam 11 upon the shaft 12. A spring 13 in compression between the lug 9 and the fork in which the cam roller 10 is mounted, serves to hold the roll to its cam. The gate 5 is provided with suction apertures, connected to a suitable suction-device (not shown). Suitable stops 14 may be provided to support the ends of the signatures in the stack $x$, and to permit the lowermost signature to bend downwardly with the swinging gate 5 away from the other signatures, ready to be engaged by the feeding off means as shown in Fig. 1.

The feeding off means comprises a gripper mechanism 20 comprising a plurality of swinging arms 22 with a fixed gripper jaw 21 at the end of each of said arms. Each arm 22 is fixed to rotate with a shaft 24 carried on the machine frame. Said shaft has fixed thereto at each end a crank arm 26. Each crank arm 26 has pivoted thereto an arm 27 connected to the eccentric 28 upon the shaft 12. The eccentric thus causes the arms 22 to swing to and from the magazine in the operation of feeding out the signatures.

Pivoted on each arm 22 is a jaw 30 spring-pressed by a spring 31. For the purpose of limiting the extent of bite of the gripper jaws upon the signature, a stop 23 is fast to each of the jaws 30 and works in an aperture in the corresponding fixed jaw 21. The pivoted jaws 30 are mounted upon a shaft $30^a$ journaled in the arms 22. Arms 32 are fixed to the shaft $30^a$ at each end thereof, each of said arms being pivotally connected to a corresponding link 33. Each link 33 is slotted at 34 to straddle the shaft 24 and is provided at its upper end with a cam roller 35. Each arm 22 extends upwardly past its bearing on the shaft 24 and carries in its upper end a stub shaft 36 having a cam 37 and a gear 38 thereon. Meshing with the gear 38 is a gear 39 fixed to a sleeve 40 carried upon the shaft 24. Each sleeve 40 has fixed thereto a sprocket wheel 41 over which runs a sprocket chain 42, said sprocket chain running also over a sprocket wheel 43 on the shaft 12. It will be understood that as the eccentrics 28, through the arm 26, rock the shaft 24, the arms 22 will be swung to and fro, and at the same time the cams 37 by means of the gears 38 and the connections to the sprocket wheels 43 on the shaft 12 will reciprocate the rods 33 to rock the shaft $30^a$ to open and close the gripper jaws 30. The parts are so arranged, constructed and timed that the grippers will nip the bent down signature and withdraw it as the arms 22 swing backwardly, the grippers again opening near the other end of the path of the arms 22 to release the signature.

It will be understood from the foregoing that a plurality of signature magazines are supplied to the number desired, and each will have its own signature-withdrawing mechanism, or that said mechanism may be arranged and connected up so as to serve for a plurality of the magazines.

Means are provided for presenting the withdrawn signatures to the opening devices, the embodied form of such means comprising traveling belts 50 running over rollers 51 carried upon the shaft 52 and also a series of rollers 53 rotating with the shaft 12. Above the rollers 53 and coöperating therewith are a series of rollers 54, preferably spring-pressed. Beyond said rollers 54 are shown a series of fingers 55 carried upon a supporting rod 56, to direct the signature between the coöperating rollers. Coöperating with the rollers 53 are a series of rolls 57. The signatures, in the present embodiment, are delivered by the grippers 20 flat upon the traveling tapes 50 with the front or open edge forward. As they are progressed by the tapes 50 they pass between the rollers 53 and 54, and are directed by the fingers 55 between the rollers 53 and 57. They then emerge with the front edge forward from between the said rollers.

Opening devices for the signatures are provided and in the illustrated form thereof are designed to act upon each side of the signature to open it out into position for insetting successive signatures and for stitching through and through. The embodied form of signature opening means comprises a hollow bar 60 provided with a plurality of suction nozzles 61, said bar being also connected by suitable means, such as a hose 62, with a suitable suction device (not shown). Said bar 60 is pivotally supported at each end by arms 63 and 64 connecting to cranks 65 and 66 upon the shaft 67. Said bar 60 is mounted to slide in guides 68 and 69, said guides being pivoted at their lower ends 70 to a support carried upon the machine frame. Each of said guides is pivotally connected to a rod 71, each of said rods 71 being connected at its opposite end to an eccentric 72 carried upon and rotating with the shaft 73. A similar bar 80 operating upon the opposite side of the signature is provided. Said bar 80 is provided with suction nozzles 81 and a connection 82 to a suitable source of suction (not shown). Said bar is likewise carried upon arms 83, pivotally connected thereto at each end. Said arms 83 are also connected to cranks 84 upon the shaft 85. The bar 80 likewise works in slotted guides 86 pivotally carried at 87 on the machine frame. Rods 88 are pivotally connected to the upper part of the guides 86, said rods having at their other ends eccentrics 89 carried by and rotating with the shaft 90. The parts are timed so that the eccentrics swing the guide links toward each other when the suction bars are at the upper end of their travel, as they are reciprocated to and fro by their cranks.

In Fig. 10 the actuating mechanism for the swinging guides 69 and 86 is shown adapted to give the inward or closing-together movement of the suction nozzles almost entirely at the upper end of their movement. This form of mechanism comprises a rod 288 pivoted to the upper part of the guide. The other end of said rod 288 is slotted and embraces the shaft 90. A cam roll 290 fixed to the rod 288 works in a groove 291 in the cam 292. This serves to give a quick closing-in movement and a gradual outward movement for the suction devices, the quick closing-in movement occurring at the top of the stroke of the suction device.

In the mechanism just described the signatures are presented from between the rolls 53 and 57 with their front edge forward and downward. The suction nozzles close in upon and press against each side of the signature as shown in Fig. 6. The suction is now applied by suitable means, and each suction device takes firm hold on its side of the signature. The suction bars begin to slide downwardly in their guides, the guides at the same time rocking backwardly, and as the suction nozzles are firmly attached to each side of the signature, the signature opens out as it is moved downwardly, as shown in Fig. 7. As the suction bars approach the lower part of their path of travel, the suction is cut off, and the open signature is released (see Fig. 8).

Means for receiving the open signatures and keeping them open, and for progressing them so that successive signatures may be associated and inset together, and so that they may then be progressed to and be operated on by the stitching means, are provided. The embodied form of said receiving or supporting devices is provided with sides 100 and 101, inclined with respect to each other and with their upper edges near together but separated to form a slot (in which the pins 105 travel) and with their bottom edges farther apart. Said members 100 and 101 are carried upon suitable supports 102 on the machine frame. Said supports 100 and 101 may extend past the successive sets of signature-supplying and signature-opening devices, and on to the stitching and refolding mechanisms, if desired.

Means are provided for progressing the opened signatures past the successive supplying and opening means, and in the embodied form thereof, the supporting members 100 and 101 are separated at their top or apex so as to provide a slot or opening. Through this slot or opening project pins 105, carried upon a sprocket chain 106, running over sprocket wheels 107 and 108. The sprocket wheel 107 is fixed to the shaft 109 carried in the yoke 110 of the standard 111 supported upon the machine frame. Fixed to the shaft 109 to rotate therewith is another sprocket wheel 112 over which runs a sprocket chain 113, said chain running also over the sprocket wheel 114. Said sprocket wheel 114 is fixed to a shaft 115 carried in a bearing 116 on the machine frame. Fixed to the shaft 115 is a bevel gear 117 meshing with a similar gear 118 upon the shaft 119. To the shaft of sprocket wheel 108 is fixed a second sprocket wheel 122. Over said second sprocket wheel 122 runs a sprocket chain 123, which chain also runs over a sprocket wheel 124. Fixed on the shaft of said wheel 124 is a beveled gear 125 meshing with a similar gear 126 upon the shaft 119. Said sprocket chain 106 may be driven at a uniform speed continuously or it may be driven intermittently in a suitable manner.

Means for presenting the collected signatures to the stitching mechanism are provided. The embodied form of said means I also choose to employ for also presenting the stitched book or pamphlet to the folding devices. The embodied form of said presenting means comprises a conveyer which receives the completed books, that is, the collection of signatures infolded and partly open, from said first mentioned conveyer and brings them to rest in position for stitching, then moves them to the folding and delivering position, from whence they are folded and delivered. The embodied form of such conveyer comprises a sprocket chain 120 working over a sprocket wheel 121 and also over a sprocket wheel 252. Said wheel 252 is fixed on a shaft 253 (see Figs. 3 and 11). Said shaft 253 has fixed thereto a bevel gear 254 meshing with a bevel gear 255 fixed to another shaft 257. Fixed on said shaft 257 is a one tooth ratchet disk 258. Loosely mounted on said shaft 257 is a pinion 259 to which is fixed an arm 260, carrying a pawl 261, said pawl coöperating with said disk 258. Meshing with said pinion 259 is a rack bar 262, slidably carried on the machine frame. Pivoted to said rack is a pitman 263, said pitman being also pivoted to a crank 264 fixed on shaft 119.

It will be understood that the crank 264, through pitman 263, reciprocates rack bar 262. Pinion 259 oscillates arm 260, pawl 261 making an idle revolution in one direction, then engaging and moving the toothed disk 258 on the counter revolution in the opposite direction. This gives the intermittent motion to the chain 120. Carried on said chain 120 are grippers 130, each gripper having two movable jaws 131 and 132 pivotally carried on a pin 133, mounted on the chain 120. Fixed to the jaw 131 is a tail 134 and a tail 135 is fixed to the jaw 132. A spring 137 acts between said tails to press them apart and thus to keep the jaws closed together. The ends 138 and 139 of said tails are bent and at the receiving and delivery position they are met by suitable cams 140 and 141, suitably mounted on the machine frame, which press on the tails to open the jaws against the action of their spring. A registering stop 142 may be provided on said grippers if desired.

In the embodied form, the gripper 130 engages the collated signatures a little to one side of the fold and a little to one side of the apex of the supporting members 100 and 101. Said sprocket chain 120 is shown supported upon a carrier 143 provided with projections 144 and 145 along which both reaches of the chain travel. The supporting member 101 is shown recessed at 146 to permit the lower gripper jaw to travel along while in engagement with the signatures underneath. A stop 147 is provided at the folding devices.

Along the path of travel of the grippers 130 is arranged the binding mechanism, shown herein as comprising three wire stitchers 150, 151 and 152, arranged longitudinally of the members 100 and 101. These stitching devices may be of a well known form and need not be described in detail. The main part of each stitcher is arranged above the signatures as they are progressed along, and the anvil or forming die being beneath, or within the open signature. The operating mechanism for the stitchers is not shown, same being well known.

In the embodied mechanism, when the signatures are all inset together the finger 105 progresses them into the open jaws 130. These jaws then close on them and start into motion. The jaws come to rest with the infolded signatures in operative relation with the stitchers 150, 151 and 152, to be stitched thereby. After the signatures are stitched the grippers start again into motion and bring the signatures to rest in the folding position. The signatures contact with the stop 147 and they are separated from the grippers 130 and are in position for refolding and delivery.

The form of delivery devices shown herein comprises means for refolding the now associated inset and stitched signatures as one. Within said supporting members 100 and 101 and in alinement with the slot or opening at their apex is shown a reciprocating folding blade 180, mounted upon rods 181 and 182. The rod 181 is supported in apertured lugs 183 and 184 of the frame 185 suitably supported on the general machine frame. The rod 181 is yoked at its lower end to carry the cam roll 186 in operative relation with the cam 187, said cam being fixed to the shaft 188 carried in the machine frame. A suitable collar 189 is fixed to the rod 188, and a spring 190 is in compression between said collar 189 and the lug 183. The rod 182 at the opposite end of the folding blade 180 is carried in the lugs 191 and 192 on the frame 185. Said rod 182 has a cam roll 193 coöperating with a cam 194 fixed to the shaft 188. Said rod is also shown provided with a collar 195 and a spring 196 in compression between said collar and the lug 191. The shaft 188 is supported in lugs 200 upon the machine frame, and has at its end a sprocket wheel 201 over which runs a sprocket 202, said sprocket chain running also over a sprocket wheel 203 upon the shaft 119 from which the shaft 188 is driven. Located above the blade 180 are the folding rolls 210 and 211. A series of tapes 212 run around the rolls 210 and over suitable guiding rolls 213 and 214 to a place of delivery. A series of tapes 215 run over said rolls 214 and rolls 216 to coöperate with the tapes 212 in carrying off the finished product. The cams 187 and 194 during their rotation lift the rods 181 and 182, and the blade 180, passing through the aperture between the supporting members 100 and 101 lifts the finished book fold foremost between the folding rolls 210 and 211 and it is carried away to a place of delivery.

The cover for the pamphlet or book may be folded in advance and may be supplied from one of the holders 1 and be opened and placed open about the inset signatures. They may then be progressed together to the stitching mechanism, be stitched together and refolded and delivered.

Suitable driving means will be provided, but such driving means in their specific form constitute no part of the present invention. A belt 220 is shown running over a pulley 221 on the shaft 58. A gear 222 on said shaft 58 meshes with a gear 223 on the shaft 12. An idler 224 connects the gear 222 with a gear 225 on the shaft 90. A sprocket 226 on the shaft 90 carries a sprocket chain 227, said chain also running over a sprocket wheel 228 on the shaft 85. Another sprocket 229 upon said shaft carries a sprocket chain 230, said sprocket chain running over a sprocket wheel 231 on the shaft 119. An idler 232 connects the gear 223 with the gear 233 on the shaft 73. A sprocket wheel 234 on said shaft carries a sprocket chain 235, said chain running over a sprocket wheel 236 fixed to the shaft 67. At the other end of the machine a belt 240 is shown running over a pulley 241 fixed to the shaft 242, which carries the driven pulleys 210. A gear train 243 connects the shaft 242 to the shaft 244 upon which the driven pulley is carried.

The manner of operation of each group of mechanisms having been described in connection with such groups, the operation of the entire machine will be clearly understood. It will further be understood that a machine has been provided realizing the objects of the invention and the advantages herein set forth, together with other objects and advantages, which will be obvious to those skilled in the art or may be learned through use of the machine.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:—

1. A book or pamphlet making machine including in combination a plurality of signature-opening devices, means for bringing together open signatures from a plurality of said opening devices and insetting one within another, and means for stitching said signatures together.

2. A book or pamphlet making machine including in combination a plurality of signature opening devices, means for bringing together open signatures from a plurality of said opening devices and insetting one within another, means for stitching said signatures together and means for folding them as one.

3. A book or pamphlet making machine including in combination a plurality of signature opening devices, means for progressing an opened signature past another of said opening devices whereby said signature and another opened signature from said other opening device are brought together and one inset within the other, and means for stitching said signatures together.

4. A book or pamphlet-making machine including in combination a series of signature-holders, a series of signature-opening devices, a series of means for supplying signatures from a holder to an opening device, means extending along said series of signature holders for conveying an opened signature from one of said opening devices past other opening devices of said series in position to be inset with signatures opened by said other opening devices, whereby said conveyed signature and signatures from said other opening devices are inset one within another, and means for stitching said signatures together.

5. A book or pamphlet making machine including in combination a plurality of signature-opening devices, means for bringing together open signatures from a plurality of said opening devices and insetting one within another, and means for stitching said signatures together, while open, from the back through to the inside.

6. A book or pamphlet making machine including in combination, a plurality of means for opening a signature and delivering it partly open with the back above, means for conveying said partly opened signature past another opening and delivering means, means for partly opening another signature and delivering it open on to the outside of said first-mentioned signature, and means for stitching the opened and inset signatures together from the back through to the inside.

7. A book or pamphlet making machine including in combination means for opening a signature and delivering it partly open with the back above, means for conveying said partly opened signature past another opening and delivering means, means for partly opening another signature and delivering it about said first-mentioned signature, means for stitching the opened and inset signatures together from the back through to the inside and means for folding them as one.

8. A book or pamphlet-making machine including in combination conveying means for conveying partly open signatures, a series of devices arranged along said conveying means for opening signatures and delivering them partly open to said conveying means one upon another, and means for stitching said signatures through from the back to the inside while open upon said conveying means.

9. A book or pamphlet making machine including in combination a continuously moving conveyer for partly opened signatures, a plurality of devices arranged along said conveyer for partly opening signatures and delivering them to said conveyer, whereby the signatures from successive opening devices are inset one within another, stitching mechanism, and an intermittently moving conveyer for receiving the inset and partly open signatures from said first-mentioned conveyer and arresting them at said stitching mechanism while being stitched and for then conveying the stitched signatures away from said stitching mechanism.

10. A book or pamphlet making machine including in combination a substantially horizontal conveying means for conveying signatures partly open with the back edge uppermost and in an endwise direction considered with respect to said signatures, a plurality of devices arranged along said conveying means for opening and delivering signatures to said conveying means, one signature upon another, whereby they are inset, and a stitching device located partly above and partly below the signatures for stitching the inset signatures together.

11. A book or pamphlet making machine including in combination means for opening a signature and dropping it open upon a support, means for opening another signature and dropping it open upon said first mentioned signature and means for stitching them together.

12. A book or pamphlet making machine including in combination means for opening a signature and dropping it open upon a support, means for opening another signature and dropping it open upon said first mentioned signature, means for stitching them together and means for folding them as one.

13. A book or pamphlet-making machine including in combination conveying means, means for opening a signature and dropping it open upon said conveying means, means for opening another signature and dropping it open upon said first-mentioned signature as it is conveyed past said second opening means, whereby the signatures are inset, and means for stitching them together.

14. A book or pamphlet making machine including in combination conveying means, means for opening a signature and dropping it open upon said conveying means, means for opening another signature and dropping it open upon said first-mentioned signature as it is conveyed past said second opening means, whereby the signatures are inset, and means for stitching said signatures together through from the back to the inside.

15. A book or pamphlet making machine including in combination conveying means, means for opening a signature and dropping it open upon said conveying means, means for opening another signature and dropping it open upon said first-mentioned signature as it is conveyed past said second opening means, whereby the signatures are inset, and means for stitching said signatures together through from the back to the inside while open upon said conveying means.

In testimony whereof, I have signed my name to this specification, in the presence of two subscribing witnesses.

CHARLES GITZENDANNER.

Witnesses:
JOHN D. MORGAN,
WM. H. HORTON.